Jan. 1, 1963  E. M. WOODFORD ETAL  3,070,925
TAPERING MECHANISM FOR ROLL-GRINDING MACHINES
Filed Oct. 5, 1960  4 Sheets-Sheet 1

INVENTORS
Ernest M. Woodford
Gunnar V. Hultgren
BY
ATTORNEYS

Jan. 1, 1963  E. M. WOODFORD ETAL  3,070,925
TAPERING MECHANISM FOR ROLL-GRINDING MACHINES
Filed Oct. 5, 1960  4 Sheets-Sheet 2

INVENTORS
Ernest M. Woodford
Gunnar V. Hultgren
BY
Rockwell Barnhardt
ATTORNEYS

INVENTORS
Ernest M. Woodford
Gunnar V. Hultgren
BY Rockwell Berthelan
ATTORNEYS

United States Patent Office 3,070,925
Patented Jan. 1, 1963

3,070,925
TAPERING MECHANISM FOR ROLL-GRINDING MACHINES
Ernest M. Woodford and Gunnar V. Hultgren, Milford, Conn., assignors to Farrel-Birmingham Company, Incorporated, Ansonia, Conn., a corporation of Connecticut
Filed Oct. 5, 1960, Ser. No. 60,700
2 Claims. (Cl. 51—49)

In the manufacture of rolls for calenders or machines for sheeting materials such as steel and plastic materials, for example, such rolls are in many instances provided at their ends with tapered journals or necks, and these necks are ground in finishing the roll as well as the working portion of the roll between these journals.

The grinding of these rolls is ordinarily effected by mounting the roll in cooperative relative with an abrasive grinding wheel, the wheel and roll both being rotated, and one of the elements being moved in relation to the other. In some instances the workpiece or roll is mounted upon a traveling table to be reciproocated relatively to the grinding wheel while in other cases the grinding wheel itself is mounted upon a reciprocating bed or platform while the work is rotated but restrained from axial movement. As illustrated, the present invention is applied to the latter type of grinding mechanism wherein the grinding wheel is moved to and fro along the work while both work and wheel are rotated.

It will be obvious that, if the tapered roll journals or necks are to be ground by the same abrasive wheel as the body of the roll, means must be provided by which the grinding wheel may be adjusted with respect to the work so as to properly engage the tapered journals, and particularly the grinding wheel during the grinding of the tapered journals must be reciprocated or moved along a path at an angle with respect to the axis of the roll to be ground. During the grinding of the body of the roll the reciprocation of the wheel is along a path substantially parallel to the axis of the grinding wheel.

Also in many instances it is desirable to provide a crown upon the body of the roll, and in such case crowning mechanism is arranged to move the grinding wheel toward and from the work during its reciprocation so as to provide the desired amount of crown. The roll necks or journals will not, however, be crowned and hence, if the same mechanism is to be employed for grinding both the body portion of the roll and the tapered journals, provision must be made for discontinuing the use of the crowning mechanism during the grinding of the tapered journals.

It is contemplated by the present invention to provide roll grinding mechanism which may be employed to grind the roll body and effect crowning thereof if desired and also be so constructed that the mechanism may be employed for grinding the tapered necks or journals at the ends of the roll.

To this end the presently illustrated mechanism embodying the invention comprises a base or bed upon which a main carriage or wheel support is slidably mounted for reciprocation thereon upon suitable ways and means are provided for reciprocating the main carriage upon the bed with respect to the work or roll to be ground which may be mounted on the bed adjacent the carriage.

Upon the main carriage is pivoted an auxiliary bed which may be swung about its pivot so that slideways provided thereon may be disposed at an angle to those upon the main bed heretofore described. Slidably mounted upon these ways on the auxiliary bed is an auxiliary carriage upon which the grinding wheel is rotatably mounted and upon which is also mounted means for rotating the grinding wheel during its reciprocation.

With this construction it will be seen that when the ways upon which the auxiliary carriage slides are placed in a position parallel to those of the main carirage and the latter is reciprocated, the grinding wheel will be moved in a path parallel to the axis of the workpiece which is the position occupied when the main body of the roll is to be ground.

However, the auxiliary bed may be swung about its pivot in either direction from this central position so as to position the ways thereof in a direction at an angle to the axis of the roll to be ground. When the auxiliary bed is in this position and the auxiliary carriage is reciprocated, the grinding wheel will be moved to and fro in a path at an angle to the axis of the workpiece or parallel to the tapered surfaces of the roll journals. It will be apparent, therefore, that when the main body of the roll is to be ground and the main carriage reciprocated, the auxiliary carriage is rigidly secured thereto in the proper position, while when the tapered journals of the roll are being ground, the auxiliary carriage only will be reciprocated and this reciprocation will occur along a path inclined to the axis of the workpiece.

One object of the present invention is to provide new and improved roll-grinding means for grinding tapered roll necks or journals of a roll as well as the cylindrical or substantially cylindrical body thereof.

Another object of the invention is to provide roll-grinding means of the character described which shall be provided with means for effecting crowning of the body portion of a roll during the grinding thereof and which may also be employed for grinding the journals or necks of the roll without effecting a crown thereon.

Still another object of the invention is to provide a roll-grinding mechanism wherein the workpiece or the grinding wheel may be reciprocated, one relatively to the other, both in a direction parallel to the axis of the roll and in a direction inclined to that axis so that tapered journals upon the roll may be ground and at the same time effect crowning of the body of the roll when desired.

Still another object of the invention is to provide in a grinding mechanism of the character described mechanism for providing a crown upon the body of a roll being ground, which crowning mechanism may be disconnected when the tapered roll journals at the ends of the rolls are being ground.

To these and other ends the invention consists in the novel features and combinations of parts to be hereinafter described and claimed.

Figure 1:
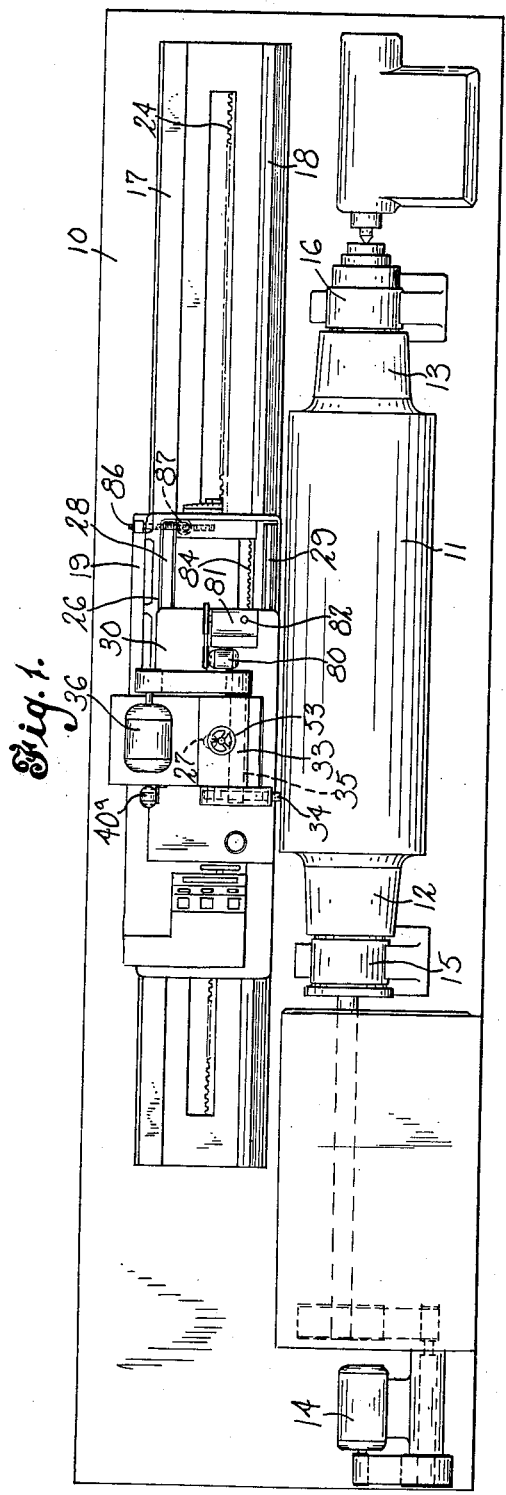
FIG. 1 is a top plan view of a work-grinding mechanism embodying our invention.

To illustrate a preferred embodiment of the invention there is shown in the drawings a grinding mechanism comprising a fixed bed 10 upon which may be rotatably mounted a roll 11 to be ground, this roll being provided with tapering end journals or necks 12 and 13. The roll or workpiece 11 may be rotated by a motor 14 mounted on the bed, the roll being carried in journal rests 15 and 16.

Figure 3:
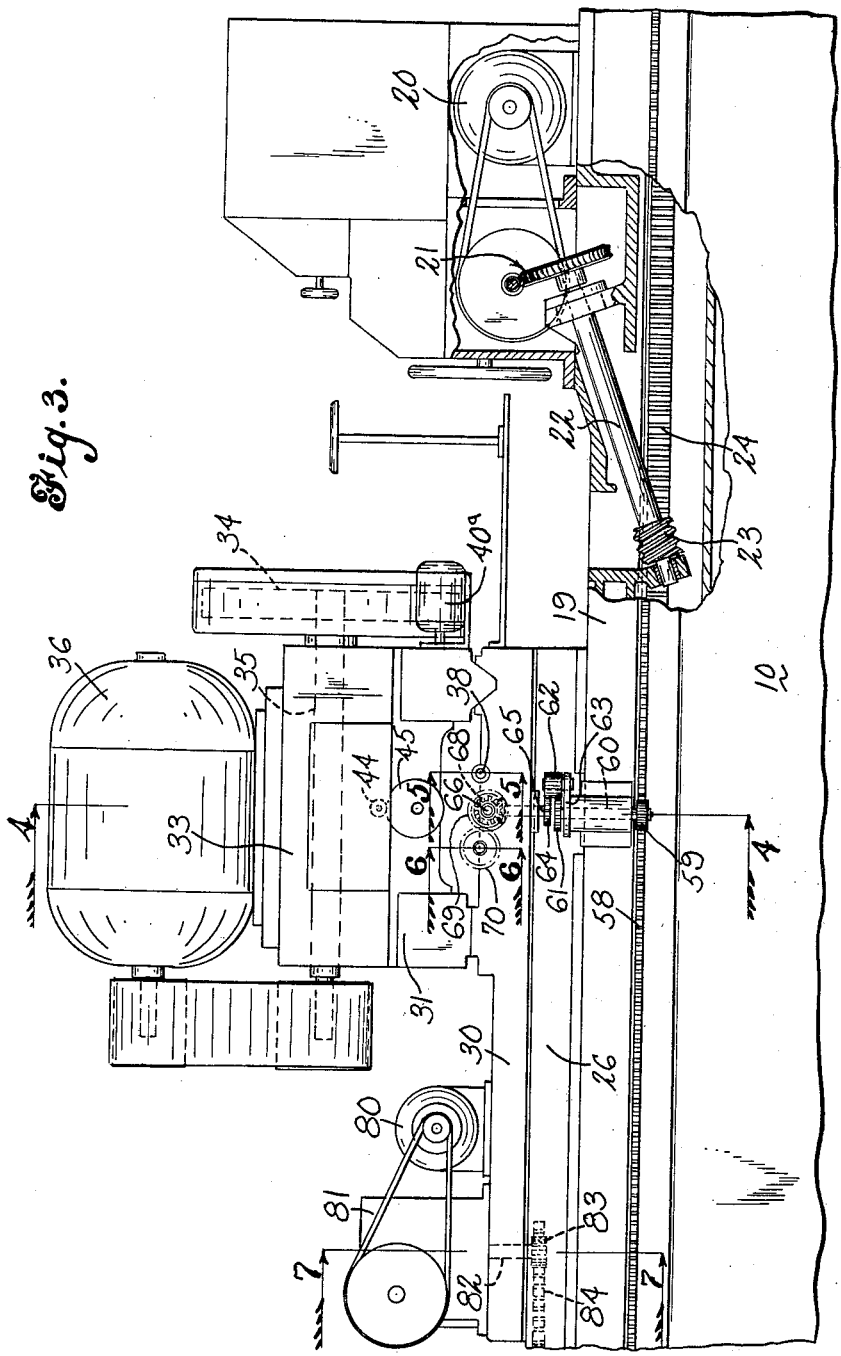
FIG. 3 is a partial rear elevational view of a grinding mechanism, some parts being broken away for sake of clearness.
Figure 4:
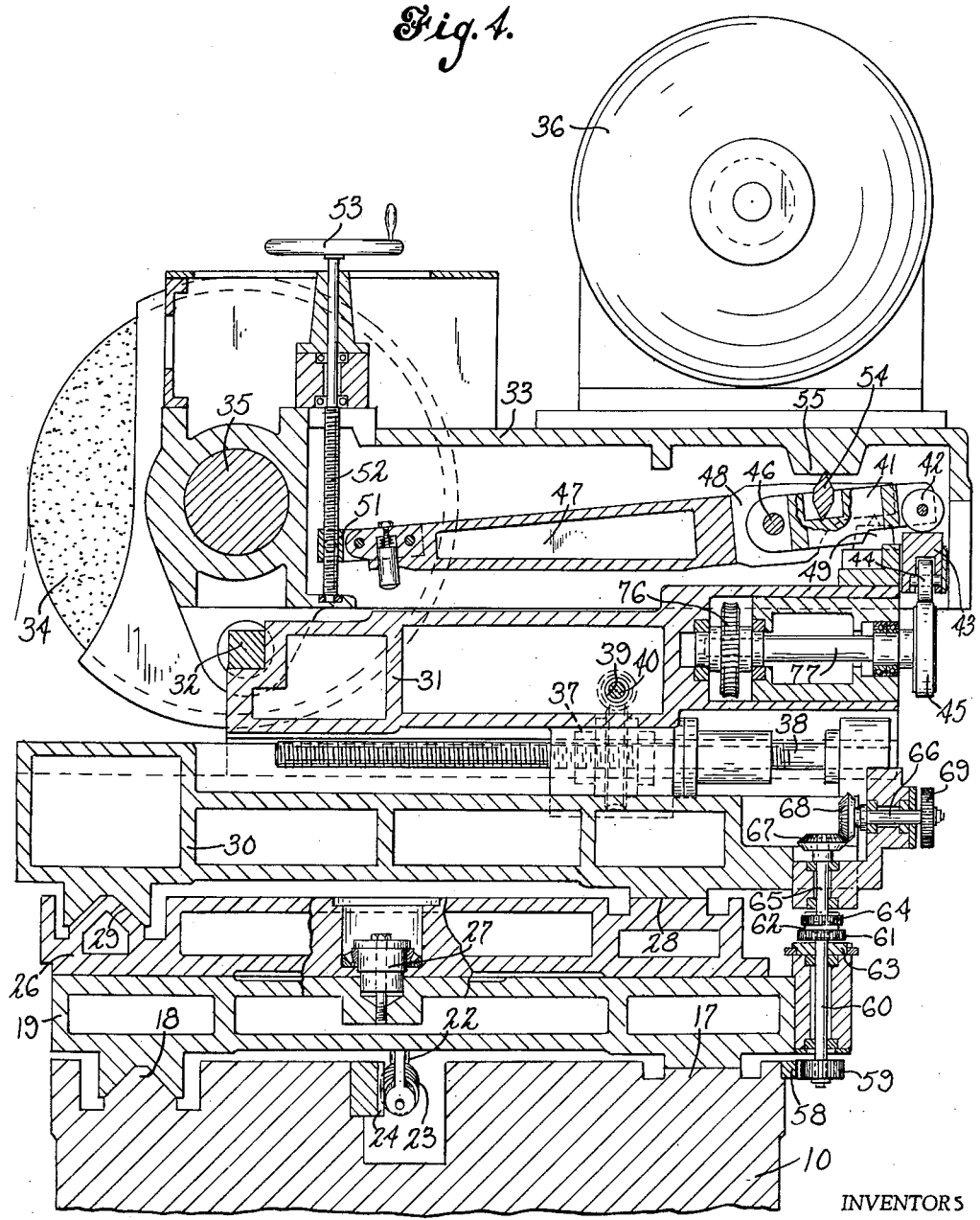
FIG. 4 is a sectional view on line 4—4 of FIG. 3.

As shown more particularly in cross-sectional view in FIG. 4, the bed 10 is provided with ways 17 and 18 upon which is slidably mounted the main carriage 19. As illustrated, this carriage is reciprocated (FIG. 3) by a motor 20 mounted on the carriage which through reduction gearing 21 drives a shaft 22 upon which is a helical gear 23 in mesh with a rack 24 carried by the bed 10. Other suitable means may be employed for this purpose.

Figure 2:
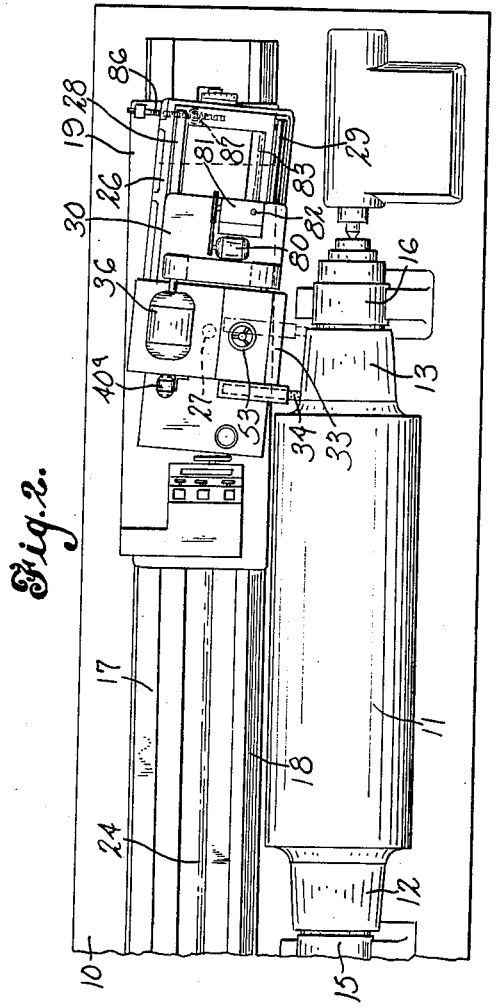
FIG. 2 is a partial top plan view showing the auxiliary bed turned at an angle to the main carriage of the grinding mechanism.

Upon this main carriage 19 is mounted an auxiliary bed 26 (FIGS. 1 and 4). This bed is pivoted to the main carriage at 27 so that it may be swung from a central position in which it is substantially parallel to the main carriage, as shown in FIG. 1, to a position inclined with respect to the main carriage, as shown in FIG. 2. This auxiliary bed is provided with ways 28 and 29 (FIG. 4) upon which is mounted an auxiliary or tapering carriage 30, the tapering carriage being capable of sliding reciprocatory movement upon the auxiliary bed 26.

Upon the tapering carriage 30 is slidably mounted a subbase 31 upon which is pivoted at 32 a wheel head 33. A grinding wheel 34 is rotatably mounted at 35 upon the wheel head, and it will be understood that movement of the subbase 31 toward the left as shown in FIG. 4, will provide a coarse feed or adjustment for moving the grinding wheel toward the work, while tilting the wheel head 33 about its pivot 32 will provide a fine feed or adjustment for feeding the grinding wheel 34 toward the work. The grinding wheel may be rotated by the motor 36 mounted on the wheel head 33.

Figure 5:
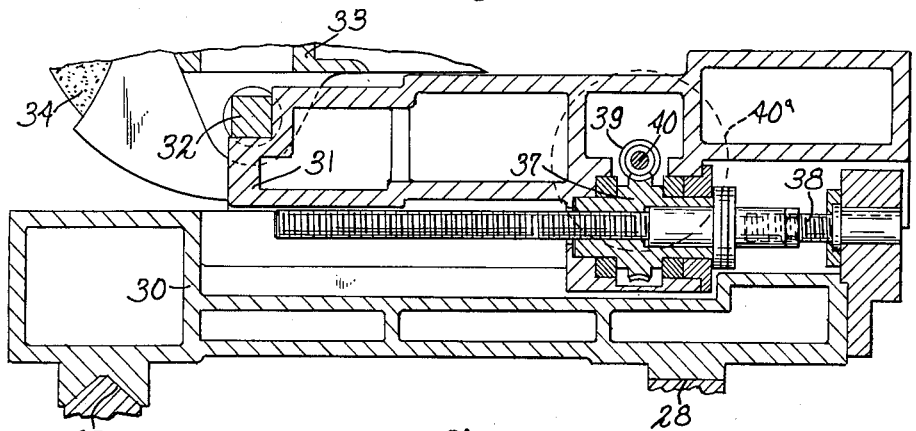
FIG. 5 is a sectional view on line 5—5 of FIG. 3.

Rotatably mounted at the lower surface of the subbase 31 is a nut 37 (FIG. 5) which threadedly receives a screw 38 rotatably mounted in the tapering carriage whereby rotation of the nut 37 will effect sliding movements of the subbase toward and from the work in a direction transverse to the movement of the carriage. This nut may be rotated by a worm 39 upon a shaft 40, this shaft being actuated by suitable means such as the motor 40ª.

As shown in FIG. 4, tilting movement of the wheel head 33 about its pivot 32 is effected in a manner similar to that shown in Hultgren Patent No. 2,814,914, granted December 3, 1957. To this end a lever 41 is provided with a roller 42 resting upon a block 43 slidably mounted in the wheel head. This block is in turn provided with a roller 44 resting upon a crown wheel 45. The other end of the lever 41 is pivoted at 46 to the intermediate portion of a relatively long lever 47, this latter lever having bifurcated end portions, one of which is shown at 48, between which the lever 41 is disposed. The right-hand end of the lever 47, as shown in FIG. 4, bears upon a block 49 upon the subbase 31 while the left-hand end of this lever is provided with a threaded sleeve 51 which threadedly receives an adjusting screw 52 rotated by the hand wheel 53.

A knife edge element 54 bears at its lower end against the lever 41 and at its upper end against a projection 55 on the wheel head 33. Rotation of the hand wheel 53 will effect raising or lowering of the lever 47 which will in turn raise or lower the wheel head about its pivot. Also for crowning the workpiece the wheel head may be moved about its pivot by rotation of the crown wheel 45 in contact with the wheel 44, the mechanism for rotating the crown wheel being hereafter described.

Figure 6:
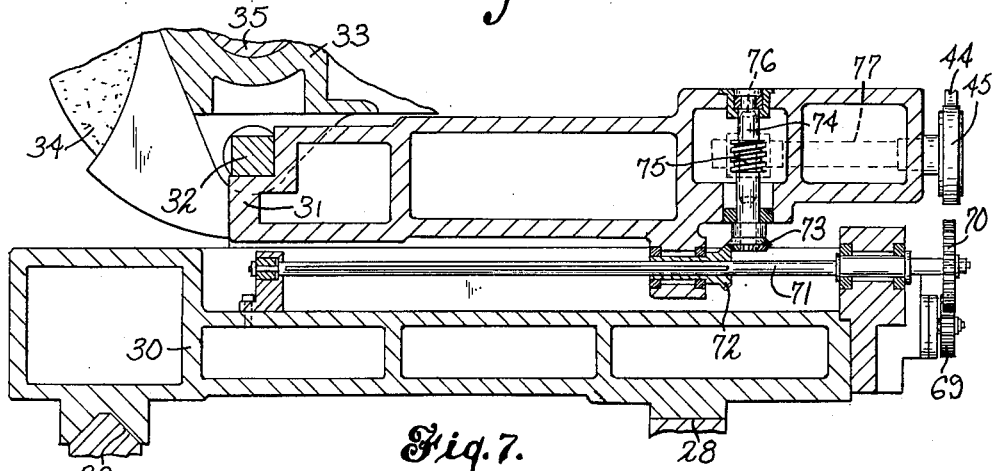
FIG. 6 is a sectional view on line 6—6 of FIG. 3.
Figure 7:
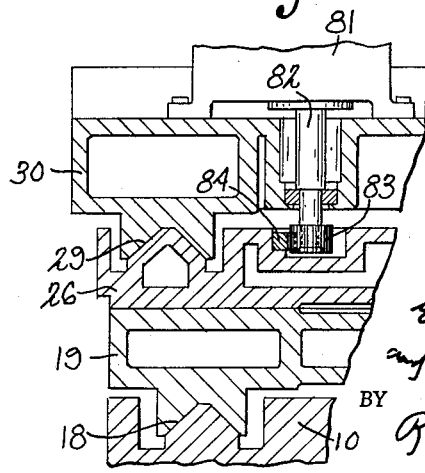
FIG. 7 is a sectional view on line 7—7 of FIG. 3.

Secured to the bed (FIGS. 3 and 4) is a second rack 58, the teeth of which are engaged by a pinion 59 secured upon a shaft 60 rotatably mounted in the main carriage. The free end of the shaft 60 carries a gear 61 which meshes with the teeth of a change gear 62 rotatably mounted upon a plate 63 on the carriage. This gear 62 in turn meshes with the teeth of a pinion 64 on a shaft 65 rotatably mounted on the auxiliary carriage 30. At its upper end this shaft drives a horizontal shaft 66 through bevel gears 67 and 68, the shaft 66 being rotatably mounted on the auxiliary carriage 30 and projecting from the carriage and having a gear 69 mounted on its projecting end. As shown in FIG. 6, the gear 69 meshes with a gear 70 upon a shaft 71 rotatably mounted on the auxiliary carriage.

Slidably splined upon the shaft 71 is a bevel gear 72 which meshes with a gear 73 upon a shaft 74 rotatably mounted in the subbase 31. The latter shaft is provided with a worm 75 meshing with a worm wheel 76 (FIG. 4) upon a shaft 77 rotatably mounted in the subbase, which shaft carries the crown wheel 45. Thus the crown wheel is rotated in timed relation to the reciprocation of the main carriage as it is actuated by the rack 58 and gear 59 as the carriage is reciprocated by its motor 20. The invention is not to be limited to the particular means for driving the crown wheel nor the particular means for driving the tapering carriage described below.

Mounted upon the tapering carriage 30 is a motor 80 (FIGS. 1 and 3) which through gear reduction mechanism 81 drives a shaft 82 which carries at its lower end a pinion 83, the teeth of which mesh with those of a rack 84 secured to the auxiliary bed 26. Thus the rotation of the pinion 83 by the motor 80 serves to reciprocate the tapering carriage 30 on its bed 26.

This auxiliary bed 26 may, as stated, be adjusted about its pivot 27 from its position shown in FIG. 1. One of these positions wherein the grinding wheel 34 is moved to position to engage the tapered journal 13 is shown in FIG. 2. When it is desired to grind the journal 12, the roll will be turned end for end. The swinging of the auxiliary bed may be effected in any desired manner. As illustrated, a screw 86 will be rotatably mounted on the main carriage, this screw being threadedly received in a pivoted nut 87 on the lower surface of the auxiliary bed.

It will be understood that as the auxiliary bed carries the tapering carriage, the latter will also be moved with the bed and reciprocation of the carriage will take place in a direction determined by the position of the auxiliary bed on the main carriage.

When the body of the roll is to be ground, the auxiliary or tapering carriage is fixed in position on the main carriage in the position shown in FIG. 1. The main carriage is then set into operation by its motor 20 and is reciprocated at the same time that the grinding wheel is rotated to grind the body of the roll. If it is desired to crown the roll, this is effected by means of the rack 58 on the bed of the machine and the crowning mechanism previously described and illustrated particularly in FIG. 4, the crown wheel 45 being rotated by engagement of the pinion 59 with the rack 58. If no crowning is desired, the gear 62 (FIG. 3) may be removed during this operation.

If it is now desired to grind one of the tapering journals or roll necks, the main carriage 19 is moved along the bed until the grinding wheel is positioned opposite the journal to be ground. The auxiliary bed is then swung about its pivot 27 to adjust it and the tapering carriage to a position where the travel of the latter will be parallel to the tapering surface of the journal. At this time the motor 80 is actuated to reciprocate the tapering carriage 30 upon its bed 26, thus moving the grinding wheel along a tapering journal.

During this taper grinding the gear 62 may be removed so as to discontinue the actuation of the crowning mechanism at this time. If the movement of the tapering carriage is over such a range as to maintain the gear 64 out of contact with the gear 62, the removal of the latter may not be necessary but it may be removed if desired. After taper grinding has been effected, the tapering carriage will be returned to its original or normal position for straight grinding or crowning where the gears 61 and 64 will again be in mesh with the gear 62.

Suitable means may, if desired, be employed for securing the auxiliary bed in its adjusted positions about its pivot, in addition to that afforded by the adjusting means itself.

While we have shown and described one embodiment of our invention, it will be understood that it is not to be limited to all of the details shown, but is capable of modification and variation within the spirit of the invention and within the scope of the claims.

What we claim is:

1. A roll-grinding mechanism comprising a supporting bed, work-supporting means thereon, a main carriage mounted on the bed for reciprocating movement, a tapering carriage, means for pivotally mounting said tapering carriage on said main carriage for swinging movement about an axis transverse to the direction of travel of the main carriage and for sliding reciprocating movement relatively to the main carriage, a subbase mounted on the tapering carriage for sliding movement toward and from the work, means for effecting the last-named sliding movement comprising an axially fixed screw carried by the tapering carriage and cooperating with a nut carried by the subbase, means for effecting said sliding movement of the tapering carriage including a pinion carried by the tapering carriage and cooperating with a rack carried by said means for mounting the last-named carriage, a grinding-wheel-carrying head pivotally mounted on the subbase, means for moving said head about its pivot comprising a lever having a fulcrum on the subbase and having a part engaging said head to move the latter, crowning means for moving said lever about the fulcrum therefor to swing the head toward and away from the work, means to swing the head toward and away from the work independently of the crowning means and acting on said lever, said means for effecting sliding movement of the tapering carriage being operative only when the main carriage is at rest, and means for reciprocating the main carriage.

2. A roll-grinding mechanism comprising a supporting bed, work-supporting means thereon, a main carriage mounted on the bed for reciprocating movement, a tapering carriage, means for pivotally mounting said tapering carriage on said main carriage for swinging movement about an axis transverse to the direction of travel of the main carriage for sliding reciprocating movement relatively to the main carriage, a subbase mounted on the tapering carriage for sliding movement toward and from the work, means for effecting the last-named sliding movement comprising an axially fixed screw carried by the tapering carriage and cooperating with a nut carried by the subbase, means for effecting said sliding movement of the tapering carriage including a pinion carried by the tapering carriage and cooperating with a rack carried by said means for mounting the last-named carriage, a grinding-wheel-carrying head pivotally mounted on the subbase, means for feeding said head inwardly toward the work by moving said head about its pivot, crowning means independently of the last-named feeding means for varying the angular position of said head with reference to the work support and the work thereon, means for rendering said crowning means inoperative without changing the angular position of said head effected by the last-mentioned infeed means, said means for effecting sliding movement of the tapering carriage being operative only when the main carriage is at rest, and means for reciprocating the main carriage.

References Cited in the file of this patent

UNITED STATES PATENTS

| | | |
|---|---|---|
| 2,025,010 | Balsiger | Dec. 17, 1935 |
| 2,161,311 | Ott | June 6, 1939 |
| 2,272,088 | Hultgren | Feb. 3, 1942 |
| 2,904,935 | Dronsfield | Sept. 22, 1959 |